United States Patent
Minov et al.

(10) Patent No.: US 10,015,157 B2
(45) Date of Patent: *Jul. 3, 2018

(54) MULTI-DOMAIN APPLICATIONS WITH AUTHORIZATION AND AUTHENTICATION IN CLOUD ENVIRONMENT

(71) Applicant: SAP SE, Walldorf (DE)

(72) Inventors: Jasen Minov, Sofia (BG); Milen Manov, Sofia (BG); Stefan Petrov, Zlataritza (BG)

(73) Assignee: SAP SE, Walldorf (DE)

( * ) Notice: Subject to any disclaimer, the term of this patent is extended or adjusted under 35 U.S.C. 154(b) by 100 days.

This patent is subject to a terminal disclaimer.

(21) Appl. No.: 15/169,841

(22) Filed: Jun. 1, 2016

(65) Prior Publication Data

US 2016/0277390 A1    Sep. 22, 2016

Related U.S. Application Data

(63) Continuation of application No. 14/141,495, filed on Dec. 27, 2013, now Pat. No. 9,386,007.

(51) Int. Cl.
*H04L 29/06* (2006.01)

(52) U.S. Cl.
CPC ........ *H04L 63/0815* (2013.01); *H04L 63/062* (2013.01); *H04L 63/10* (2013.01)

(58) Field of Classification Search
CPC ............... G06F 21/41; H04L 29/12122; H04L 61/1547; H04L 67/02; H04L 63/0815;

(Continued)

(56) References Cited

U.S. PATENT DOCUMENTS

| 2003/0023880 A1* | 1/2003 | Edwards | H04L 63/0815 726/1 |
| 2003/0149781 A1* | 8/2003 | Yared | G06F 21/41 709/229 |

(Continued)

OTHER PUBLICATIONS

Shubho et al, "Single Sign On (SSO) for cross-domain ASP.NET applications: Part 1 The design blue print" Oct. 2010 http://www.codeproject.com/Articles/106439/SingleSignOnS-SOforcrossdomainASPNETapplic, CodeProject, pp. 1-18.*

*Primary Examiner* — Harunur Rashid
(74) *Attorney, Agent, or Firm* — Buckley, Maschoff & Talwalkar LLC

(57) ABSTRACT

A multi-domain application requiring SSO and SLO operations in cloud environment is presented. The computing system of the multi-domain application includes a multi-domain service (MDS) to redirect the calls for the multi-domain application to an identity provider to authenticate the user or to invoke the single logout services (SLOs) on the domains of the multi-domain application and to invalidate the user sessions on the domains. A cookie that includes the multi-domain application URL is generated to reach the assertion consumer service (ASC) and the single logout service (SLO) that receive an identity assertion response from the identity provider. Domain specific SLOs are provided. A trust between these domain specific SLOs and the SLO is provided based on service provider keys. The SAML mechanism for a logout scenario is reused for communication between the SLO and the domain specific SLOs, where the SLO plays a role of a local IDP.

20 Claims, 5 Drawing Sheets

(58) Field of Classification Search
CPC .. H04L 63/102; H04L 63/0807; H04L 63/105
See application file for complete search history.

(56) References Cited

U.S. PATENT DOCUMENTS

2004/0230831 A1* 11/2004 Spelman ................. G06F 21/33
726/8
2013/0179573 A1* 7/2013 McCarty ............. H04L 63/0823
709/225

* cited by examiner

MULTI-DOMAIN APPLICATIONS WITH AUTHORIZATION AND AUTHENTICATION IN CLOUD ENVIRONMENT

This application is a continuation of U.S. Non-Provisional patent application Ser. No. 14/141,495, filed Dec. 27, 2013.

BACKGROUND

In cloud environment, software products such as cloud-based applications can be provided as services. One system may be used to host and run multiple applications or multiple instances of an application for one or more customers. A cloud platform enables a large number of computers to be connected through a real-time network such as the Internet. In this way, hosted application services that run on the cloud platform can be provisioned to run client server software on a remote location. End users may access the cloud-based applications through a Web browser, a thin client, a mobile application, etc., while the enterprise software and the users' data are stored on server nodes at a remote location. Cloud providers may install and operate application software in the cloud and cloud users access the software from cloud clients. Cloud users may not manage the cloud infrastructure and platform where the application runs. This would eliminate the need to install and run the application on the cloud users own computers, which simplifies maintenance and support.

Authorization and authentication between a Web browser and a Web application of a cloud provider may be performed via Security Assertion Markup Language (SAML). SAML is an XML-based (Extensible Markup Language) open standard data format for exchanging authorization and authentication data between an identity provider and a service provider. An identity provider is responsible for issuing identification information for all providers looking to interact with a system (such as a system on the cloud platform). This is achieved via an authentication module which verifies a security token as an alternative to explicitly authenticating a user within a security realm. One of the features that SAML addresses is Web browser single sign-on (SSO).

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for methods and systems including a multi-domain application with authentication and authorization in cloud environment are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Generally, the SAML specification defines three roles: the user, the identity provider (IDP), and the service provider (SP). The user requests a service from the service provider, then the service provider requests and obtains an identity assertion from the identity provider. On the basis of this assertion, the service provider can make an access control decision—this means, it can decide whether to perform some service for the connected user. Before delivering the identity assertion to the SP, the IDP may request some information from the user to authenticate the user, such as a user name and a password. The SAML specifies the assertions between the three parties: the messages that assert identity that are passed from the IDP to the SP. In SAML, one identity provider may provide SAML assertions to many service providers. Conversely, one SP may rely on and trust assertions from many independent IDPs.

Figure 1:
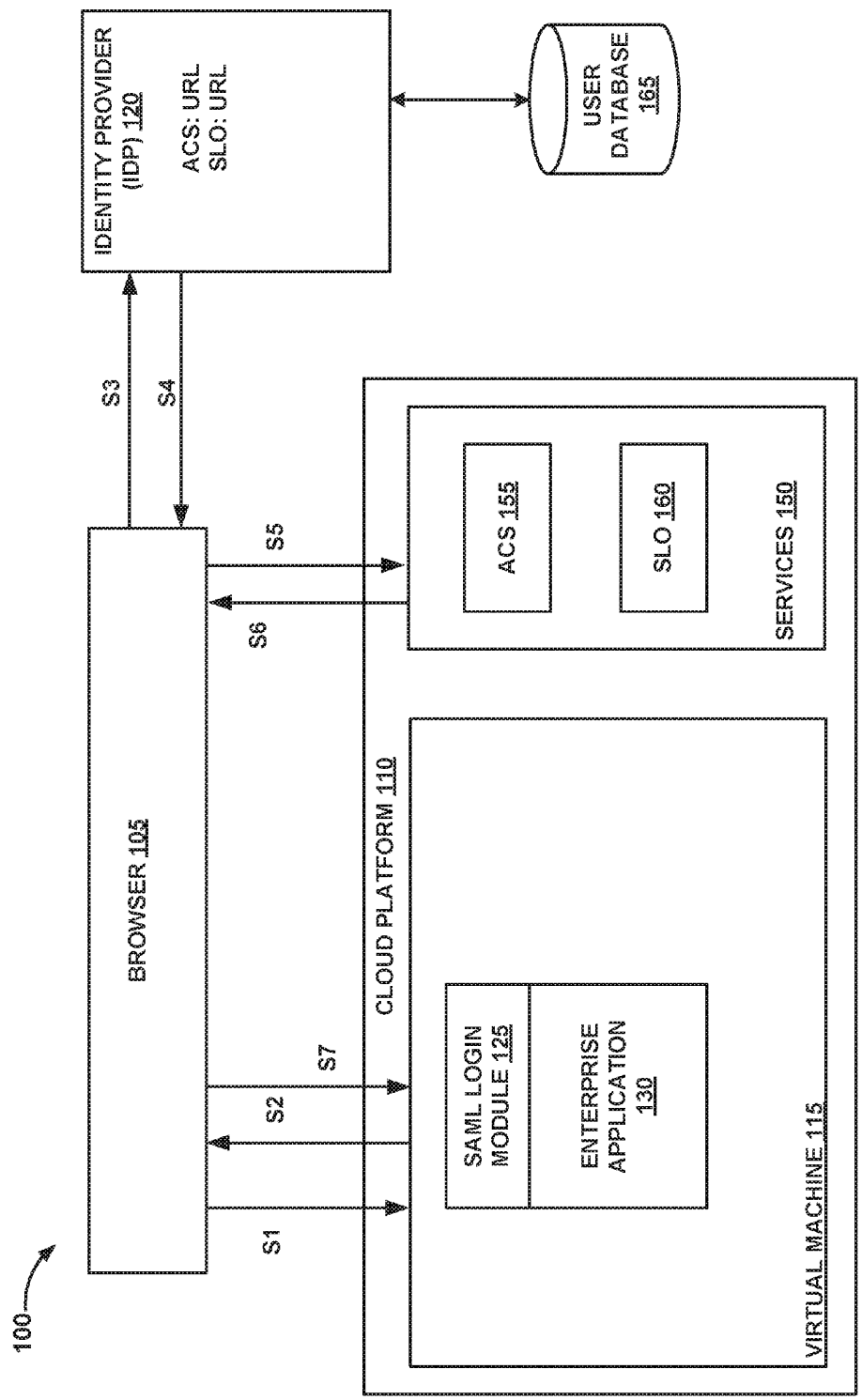
FIG. 1 is a block diagram illustrating an architectural overview of a computing system including SAML services, according to some embodiments.

FIG. 1 is a block diagram illustrating an architectural overview of a computing system including SAML services, according to some embodiments. System 100 may comprise a general-purpose computing system and may execute program code to perform one or more of the processes described herein. System 100 may include other not shown elements according to some embodiments.

Computing system 100 includes one or more Web clients, such as Web browser 105, connected to a cloud platform 110. Users can access cloud platform and its resources (e.g., enterprise applications) by sending requests via the Web browser 105. SSO options for Web-based access enable users to securely access information and back-end system resources located in the intranet or on the Internet. The communication for Web-based authentication, and respectively access authentication, uses mechanisms that are supported by the HTTP protocol for Internet communication.

Cloud platform 110 may include one or more virtual machines 115 of a customer system. The Web browser 105 is also connected to an identity provider (IDP) 120. The identity provider 120 can be described as a service provider for storing identity profiles. It should be noted however that IDPs can also provide services beyond those related to the storage of identity profiles. In various embodiments, the IDP 120 is an identity assertion provider, a specific form of an authentication provider that allows users or system processes to assert their identity using tokens. Identity assertion providers enable perimeter authentication and support single sign-on. The identity assertion provider can generate a token from a digital certificate and that token can be passed around the system so that users are not asked to sign on more than once. IDP 120 is a separate module against which the user authenticates. IDP 120 may support various user authentication mechanisms (certificate, user name/password, etc.)

The virtual machine 115 includes an SAML login module 125. A login module may handle a variety of authentication mechanisms, including user name/password combinations, smart cards, biometric devices, and so on. The login module may provide single sign on (SSO) via a particular SSO protocol/framework (e.g. SAML™, OpenID™, and SPNEGO™), can check for the presence of hardware security tokens (e.g., a USB token), and so on. Login modules contain the actual code for authentication. A login module can use various mechanisms to authenticate user credentials. The code could retrieve a password from a database and compare it to the password supplied to the module. The SAML login module 125 checks the request sent from the Web browser 105 requesting authentication access to enterprise application 130. The SAML login module is part of the service provider of cloud platform 110. The SAML login module is a Java Authentication and Authorization Service (JAAS) login module that can request authentication and logout functions from an identity provider. In addition, the SAML login module 125 validates SAML assertions issued by the identity provider to authenticate a given user.

The SAML login module 125 represents a service provider that authenticates the user request before passing the request to the application 130. The service provider, represented by the SAML login module 125, contacts a separate online identity provider 120 to authenticate users who are trying to access secure content. The service provider requests and obtains an identity assertion from the identity provider 120 based on the authentication parameters provided with the request. The identity provider 120 includes a list of endpoint URLs for which the IDP 120 can issue identity assertions. The IDP 120 is connected to a user database 165 that stores user data for the identity assertions. There is a pre-defined trust relationship between the service provider and the identity provider 120. The service provider trust the assertions issued by the identity provider 120 and the identity provider 120 issues assertions on the results of the authentication and authorization of users who are willing to access services at the SAML login module 125.

Cloud platform 110 also includes a set of services 150 such as Assertion Consumer Service (ACS) 155 and Single Logout Service (SLO) 160. ACS 155 and SLO 160 are implemented according to the SAML standard. In various embodiments, they may be implemented as servlets accessed via endpoint URLs. The SLO service is a service provided by the service provider. The SLO 160 processes logout requests and logout responses sent by the identity provider. The URL location of the SLO service is listed in the identity provider. The ACS 155 receives and processes assertions from the IDP 120. For service provider-initiated single sign-on, if the Assertion Consumer Service 155 (ACS) endpoint is specified in the authentication request, then this ACS endpoint should match to one of the entries in the configured list of ACS URLs on the identity provider 120 side.

In a single sign-on (SSO) scenario, at step S1, the Web browser 105 sends a request to cloud platform 110 to access enterprise application 130. Enterprise application 130 is protected with the SAML standard in a declarative way. The request is processed by the virtual machine 115. It is checked if the user of the request is authenticated to access the enterprise application 130. The SAML login module 125 is invoked. The SAML login module 125 is responsible to authenticate the user of the request. The SAML login module 125 acts as a service provider and generates an SAML authentication request. The SAML authentication request is encoded and embedded into the URL for the IDP's SSO service.

At step S2, the SAML login module 125 sends a redirect to the user's browser 105. The redirect URL includes the encoded SAML authentication request that should be submitted to the IDP's SSO service. In various embodiments, the SAML login module 125 sends an authentication request as an URL parameter or as HTTP Post parameter through browser 105. Further, the SAML login module 125 issues an OUC cookie (original URL cookie) that comprises the requested application 130 URL.

Then, at step S3, the browser 105 sends the authentication request to the IDP 120. The IDP 120 decodes the SAML authentication request and extracts the URL for the ACS 155 endpoint. The IDP 120 then authenticates the user. Identity providers could authenticate users by either asking for valid login credentials or by checking for valid session cookies. Then, the IDP 120 generates an assertion response that includes an assertion parameter with the authenticated user's username. In accordance with the SAML specification, this response may be digitally signed with the IDP's public and private keys.

Further, at step S4, the IDP 120 encodes the assertion response and the OUC cookie name and returns that information to the user's browser 105. The IDP 120 provides a mechanism so that the browser can forward that information to ACS 155, at S5. The ACS 155 verifies the SAML assertion response using the predefined trust with the IDP 120. At S6, if the response is successfully verified, the ACS 155 redirects the response to the browser 105. Since the enterprise application 130 URL is not part of the assertion parameter, the ACS 155 retrieves the enterprise application 130 URL from the OUC cookie.

Then, at S7, the browser 105 sends a request to the enterprise application 130 using the retrieved enterprise application 130 URL from the OUC cookie and the assertion parameter. The request is received at the SAML login module 125. The SAML login module 125 receives the assertion parameter from the IDP 120 and based on it, logs the user into the application 130. During the login, a session cookie and a tenant session cookie (if a tenant session cookie was not already issued) are issued. Then, the Web browser 105 is redirected to the original application URL. The OUC cookie is deleted.

While single sign-on means creating a new session based on a session at the IDP, single logout specifies a method to remove all sessions (both at the IDP and all of the SPs) at once. In a single logout (SLO) scenario, users can cleanly close all their sessions in a SAML landscape. At step S1, the Web browser 105 sends a single logout request to the enterprise application 130. The SAML login module 125 is invoked. The SAML login module 125 checks if the user is authenticated and invalidates the user session. Then, the SAML login module 125 redirects the browser 105 to the IDP 120 to invalidate the global session.

At step S2, the SAML login module 125 sends a redirect to the user's browser 105. The redirect URL includes the SAML logout request that should be submitted to the IDP's SLO service. In addition, the SAML login module 125 adds an SAML assertion parameter that the IDP 120 is going to process. Further, the SAML login module 125 generates an OUC cookie (original URL cookie) that comprises the original application 130 URL.

Then, at step S3, the browser 105 sends the logout request to the IDP 120. The IDP 120 receives the SAML logout request and the OUC cookie name. The IDP 120 then invalidates the current user session on the IDP. In addition, the IDP 120 enumerates other service providers (if any) and invokes their SLO service endpoints to invalidate their local sessions as well.

Further, at step S4, the IDP 120 encodes the assertion parameter and the OUC cookie name and returns that information to the user's browser 105. The IDP 120 provides a mechanism so that the browser can forward that information to SLO 160, at S5. The SLO 160 verifies the SAML assertion response using the predefined trust with the IDP 120. At S6, the SLO 160 redirects the response to the browser 105. Since the enterprise application 130 URL is not part of the assertion parameter, the SLO 160 retrieves the enterprise application 130 URL from the OUC cookie.

Then, at S7, the browser 105 sends a request to the enterprise application 130 using the retrieved enterprise application 130 URL from the OUC cookie and the assertion parameter. The request is received at the SAML login module 125. The SAML login module 125 receives the assertion parameter from the IDP 120 and based on it, logs the user out of the application 130 and invalidates the user session. During the logout, a session cookie and a tenant session cookie (if a tenant session cookie was sent from the Web browser) are invalidated. Then, the Web browser 105 is redirected to the original application URL. The OUC cookie is deleted.

During logout, the IDP invalidates different SP sessions by enumerating the SPs SLO endpoints and invoking them. This means that when a call for session invalidation comes to the SLO endpoint, the respective session has to be invalidated. Additionally, on every request both sessions (the standard session and the tenant session) are checked and if the tenant session is missing (or is invalid), then that means the standard Web server session is not valid anymore.

The presented SSO and SLO scenarios may not handle multiple URL domains for accessing an enterprise application. This is because the SLO endpoint configuration and the ACS endpoint configuration on the IDP site are per a service provider. This means that the domain of the SLO/ACS endpoints should be the same (or at least have the same root domain such as "*.ondemand.com") as the enterprise application that is requested. Both endpoints may consume the OUC cookie that is issued when the enterprise application is requested. For example, if there are two domains: "example.eu" domain and "example.de" domain, the ACS endpoint and the SLO endpoint may be set to be on "authn.example.eu" domain and define this configuration in the IDP, that means the SAML login/logout for "example.de" may not work. A workaround may be creating a second service provider for the "example.de" domain. Although, this is a working solution, it means additional overhead for the user.

Figure 2:
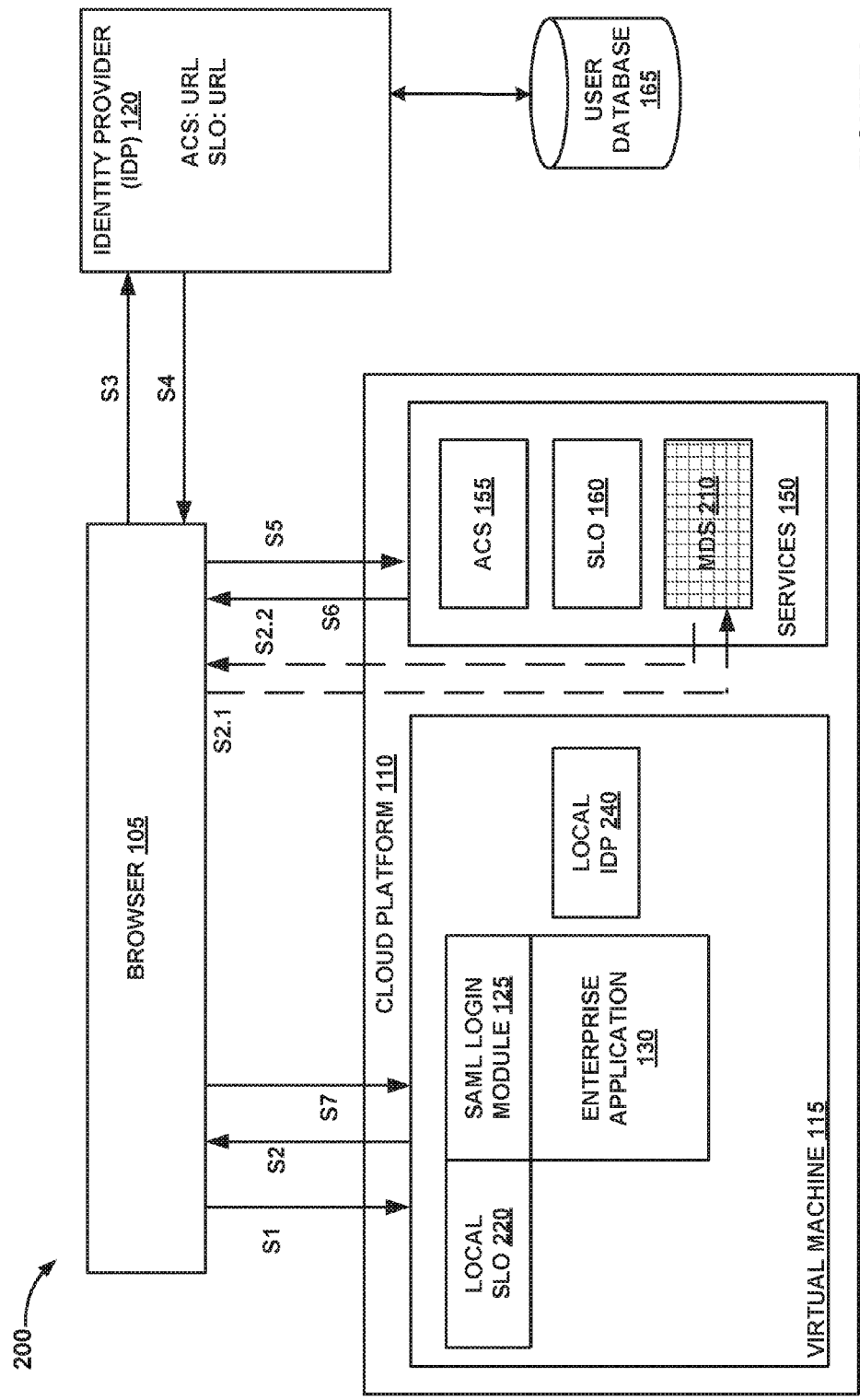
FIG. 2 is a block diagram illustrating an architectural overview of a computing system including a multi-domain service, according to some embodiments.

FIG. 2 is a block diagram illustrating an architectural overview of a computing system including a multi-domain service, according to some embodiments. System 200 may comprise a general-purpose computing system and may execute program code to perform one or more of the processes described herein. System 200 may include other not shown elements according to some embodiments.

In various embodiments, a computing system 200 is presented that supports multiple domains within one service provider for authentication and authorization scenarios such as SAML SSO and SLO scenarios. Computing system 200 includes similar elements as computing system 100. Further to the elements of computing system 100, system 200 includes a multi-domain service (MDS) 210 as part of services 150. The MDS 210 endpoint is invoked to redirect the calls coming from the enterprise application 130 to the IDP 120 and to issue the OUC cookie with the correct domain name. In multiple domain scenarios, the OUC cookie has to reach the ASC 155 and SLO 160 endpoints. The OUC cookie can reach the ASC 155 and SLO 160 endpoints if the OUC cookie is issued from the domain where the services' endpoints reside. That is why, the MDS 210 is presented and invoked to generate the OUC cookie with the correct domain name.

Further, computing system 200 enables when a logout request is received at the SLO 160, the service provider to log out the user from domains used. In various embodiments, the domains that the user had logged in are enumerated. Then, the local SLO 220 endpoint is invoked on an enumerated domain to log out the user from this domain. The local SLO 220 is a service running on an application domain. This may be the SLO 160 endpoint that resides in the enterprise application virtual machine and that is visible on the domains where the enterprise application is visible.

In a single sign-on (SSO) scenario, at step S1, the Web browser 105 sends a request to cloud platform 110 to access enterprise application 130. For example, the user tries to access via the Web browser 105 a domain with the following URL: "http://example.eu/ . . . ." Enterprise application 130 is protected with the SAML standard in a declarative way. The request is processed by the virtual machine 115. It is checked if the user of the request is authenticated to access the enterprise application 130. The SAML login module 125 is invoked. The SAML login module 125 is responsible to authenticate the user of the request. The SAML login module 125 acts as a service provider and generates an SAML authentication request.

The SAML login module 125 determines that the enterprise application 130 is a multi-domain application. This means, an application that can be requested and can run on multiple domains in parallel. For example, "http://example.eu/ . . . ", "http://example.com/ . . . ", "http://example.net/ . . . ", and so on. Therefore, the SAML login module 125 redirects the browser 105 to the MDS 210 endpoint URL, at S2. The MDS 210 endpoint URL points to a domain, on which the services 150 endpoints can be invoked. For example, "mds.ondemand.com", "acs.ondemand.com", "slo.ondemand.com". In addition, the SAML login module 125 adds one or more signed request parameters for the MDS 210 to issue an assertion, which the IDP 120 has to process.

At S2.1, the browser 105 requests the MDS 210 endpoint URL. For example, the browser requests "mds.ondemand.com". The MDS 210 validates that the request is sent from the SAML login module 125 by the signed request parameters. The MDS 210 issues an OUC cookie that includes the original application 130 URL; this is "http://example.eu/ . . . ." Then, the MDS 210 creates a login request assertion and redirects the browser to the IDP 120, at S2.2.

Then, at step S3, the browser 105 sends the authentication request to the IDP 120. The IDP 120 decodes the SAML authentication. The IDP 120 then authenticates the user. Then, the IDP 120 generates an assertion response that includes an assertion parameter with the authenticated user's username. In accordance with the SAML specification, this response may be digitally signed with the IDP's public and private keys. Also, a session cookie is issued for the user for the IDP 120.

Further, at step S4, the IDP 120 encodes the assertion response and the OUC cookie name and returns that information to the user's browser 105. The IDP 120 includes the ACS 155 endpoint URL as predefined configuration per a service provider, so that the browser can forward the assertion response to ACS 155, at S5. The ACS 155 verifies the SAML assertion response using the predefined trust with the IDP 120.

At S6, if the response is successfully verified, the ACS 155 redirects the response to the browser 105. Since the enterprise application 130 URL is not part of the assertion parameter, the ACS 155 retrieves the enterprise application 130 URL from the OUC cookie. Additionally for multi-domain service providers, the ACS 155 issues a separate cookie, an application domain cookie, (or extends its current value, if the cookie is present) with the name of the domain of the requested application 130 (e.g., "http://example.eu/ . . . .") The OUC cookie is deleted. In this way, the browser 105 is redirected to the original application URL (e.g., "http://example.eu/ . . . ") and the IDP assertion is passed to the enterprise application 130.

Then, at S7, the browser 105 requests the enterprise application 130 using the retrieved enterprise application 130 URL from the OUC cookie and the assertion parameter. The request is received at the SAML login module 125. The SAML login module 125 receives the assertion parameter from the IDP 120 and based on it, logs the user into the application 130. During the login, a session cookie and a tenant session cookie (if a tenant session cookie was not already issued) are issued. Then, the Web browser 105 is redirected to the original application URL.

While single sign-on means creating a new session based on a session at the IDP, single logout specifies a method to remove the sessions (at the IDP, at the SPs) at once on the multiple domains the user is logged in. In a single logout (SLO) scenario, users can cleanly close their sessions in a SAML landscape. At step S1, the Web browser 105 sends a single logout request to the enterprise application 130. The SAML login module 125 is invoked. The SAML login module 125 checks that the user is authenticated and invalidates the user session.

The SAML login module 125 determines that the enterprise application 130 is a multi-domain application. Therefore, the SAML login module 125 redirects the browser 105 to the MDS 210 endpoint URL, at S2. The MDS 210 endpoint URL points to a domain, on which the services 150 endpoints can be invoked. For example, "mds.ondemand.com", "acs.ondemand.com", "slo.ondemand.com". In addition, the SAML login module 125 adds one or more signed request parameters for the MDS 210 to issue an assertion, which the IDP 120 has to process.

At S2.1, the browser 105 requests the MDS 210 endpoint URL. For example, the browser requests "mds.ondemand.com". The MDS 210 validates that the request is sent from the SAML login module 125 by the signed request parameters. The MDS 210 issues an OUC cookie that includes the original application 130 URL, e.g., "http://example.eu/ . . . ." Then, the MDS 210 creates a logout assertion request and redirects the browser to the IDP 120, at S2.2.

Then, at step S3, the browser 105 sends the logout request to the IDP 120. The IDP 120 receives the SAML logout request. The IDP 120 then invalidates the current user session on the IDP. In addition, the IDP 120 enumerates other available service providers (if any) and invokes their SLO service endpoints to invalidate their local sessions as well. The user is logged out from the IDP 120.

Further, at step S4, the IDP 120 encodes the assertion parameter and the OUC cookie name and returns that information to the user's browser 105. The IDP 120 includes the SLO 160 endpoint URL (e.g., "slo.ondemand.com") as a predefined configuration so that the browser can forward that information to SLO 160, at S5. The main task of the SLO 160 is to redirect the browser 105 back to the application 130 URL and to invalidate the user session (if still not invalidated for that service provider). The SLO 160 verifies the SAML assertion response using the IDP's keys from the local IDP 240. Since the enterprise application 130 URL is not part of the assertion parameter, the SLO 160 retrieves the enterprise application 130 URL from the OUC cookie. Since the SAML login module 125 supports multiple domains, the logout request has to be redirected to the domain specific SLOs of the multiple domains of the service provider, where the user is logged in.

In various embodiments, the Web browser 105 is redirected to a specific application domain SLO. The main goal of the domain specific SLO is to invalidate the user session, if still not invalidated, for that domain of the service provider (the SAML login module 125). Then, the browser 105 is redirected back to the initial SLO 160 endpoint. In addition, an SLO domain cookie is generated to preserve any information from the IDP 120. In other embodiments, the browser is redirected to the enterprise application 130 URL, at step S7.

In various embodiments, the SLO iterates through the multiple domains supported by the service provider where the user is logged in. The names of the multiple domains are stored in the application domain cookie. For a domain from the multiple domains, the initial SLO 160 service sends a logout request to the domain specific SLO service of the domain. The domain specific SLO service logs the user out of the domain and sends back a logout response to the initial SLO 160 service. When the domain specific SLO services log the user out of the multiple domains, the browser is redirected to the enterprise application 130 URL. The communication between the initial SLO 160 and the domain specific SLOs (local SLOs), the initial SLO 160 plays a role of a local IDP reusing the service provider keys and for this communication and for the trust between this local IDP and the service provider. Domain specific SLOs are working with the service provider keys and may verify, based on the trust that requests are coming from the initial SLO 160.

At S6, the initial SLO 160 redirects the response back to the browser 105. Then, at S7, the browser 105 sends a request to the enterprise application 130 using the retrieved enterprise application 130 URL from the OUC cookie and the assertion parameter. The request is received at the SAML login module 125. The SAML login module 125 receives the assertion parameter from the IDP 120 and based on it, logs the user out of the application 130 and invalidates the user session. During the logout, a session cookie and a tenant session cookie (if a tenant session cookie was sent from the Web browser) are invalidated. The SLO domain cookie is also invalidated. Then, the Web browser 105 is redirected to the original application 130 URL. The enterprise application 130 checks that user is already logged out and returns some specific logout page.

In various embodiments, the communication between the SLO 160 and the specific application domain SLO could be performed following the SAML IDP initiated logout protocol. The SLO 160 plays the role of a local IDP and in this case, it is possible to have no changes in the application domain SLO endpoints. The application domain cookies could store just the mapping (index) of the logged application domain, not the full domain name. Additionally, a list with domains (indexed) should be provided as multi-domain configuration.

Figure 3:
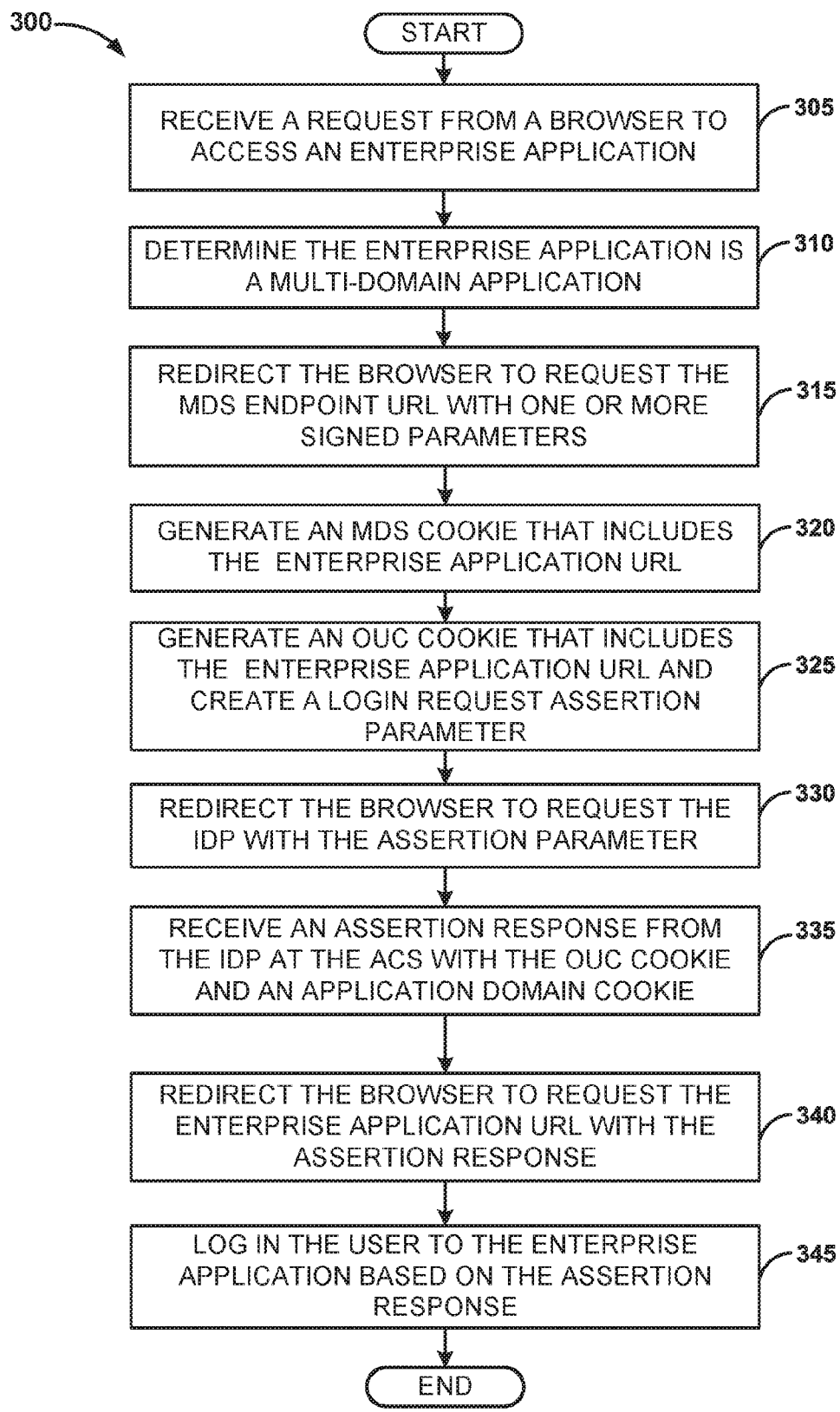
FIG. 3 is a flow diagram illustrating process 300 to perform single sign-on authentication for a multi-domain application, according to some embodiments.

FIG. 3 is a flow diagram illustrating process 300 to perform single sign-on authentication for a multi-domain application, according to some embodiments. In some embodiments, various hardware elements (e.g., processors) execute program code to perform process 300. Process 300 and other processes described herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 300 defines a procedure to perform single sign-on (SSO) authentication for a multi-domain enterprise application in cloud environment. In various embodiments, the SSO is based on the SAML protocol.

At 305, a request is received from a Web browser to access an enterprise application running in cloud environment. The Web container of the server running the enterprise application checks if the user sending the request is authenticated with the enterprise application. If not, the service provider is invoked to handle the authentication of the user. The request is received at a service provider of a virtual machine. In various embodiments, the service provider is realized as SAML login module 125. At 310, it is determined that the enterprise application is a multi-domain application that can be accessed from multiple domains per a service provider.

At 315, the browser is redirected to request the MDS endpoint by providing the MDS endpoint URL. For example, "mds.ondemand.com". In addition, the service provider adds one or more request parameters signed by the service provider. The request parameters may be used by the MDS to create a login request assertion that will be processed by the IDP. Further, an MDS cookie is generated that includes the enterprise application URL, at 320. Thus, the MDS is requested by the browser (on the MDS domain) with at least: one or more request parameters signed by the service provider and an MDS cookie with the enterprise application URL. The request is received at the MDS. The MDS verifies that the request is redirected from the service provider by the signed request parameters included in the request.

At 325, an OUC cookie is generated by the MDS. The OUC cookie includes the enterprise application URL. Based on the verified request parameters signed by the service provider, a login request assertion is created as a parameter and included in the authentication request. Then, the browser is redirected to request the IDP, at 330. The request includes the IDP URL and the login request assertion parameter. The IDP authenticates the user and issues an assertion response. Also, the IDP issues a session cookie for the user to the IDP, which can be used by the user within the current session. The browser is then redirected to the ACS of the computing system. The ACS URL is listed in the IDP as a predefined configuration.

At 335, the assertion response created by the IDP is received at the ACS. The assertion response is included in the browser request to the ACS together with the OUC cookie name. In various embodiments, the ACS has to redirect the browser back to the enterprise application URL. As the enterprise application URL is not part of the assertion response, the enterprise application URL is retrieved from the OUC cookie. An application domain cookie is generated that includes the name of the domain of the requested enterprise application. As a result, at 340, the browser is redirected to request the enterprise application URL with the assertion response. The OUC cookie is deleted.

At 345, the user is logged in the enterprise application based on the assertion response. During the login, a session cookie and a tenant session cookie (if the tenant session cookie was not already issued) are issued. Then, the browser is redirected to the enterprise application URL. As a result, a user session is created. Finally, the enterprise application is invoked with the authenticated user and application data is returned to the user.

Figure 4:
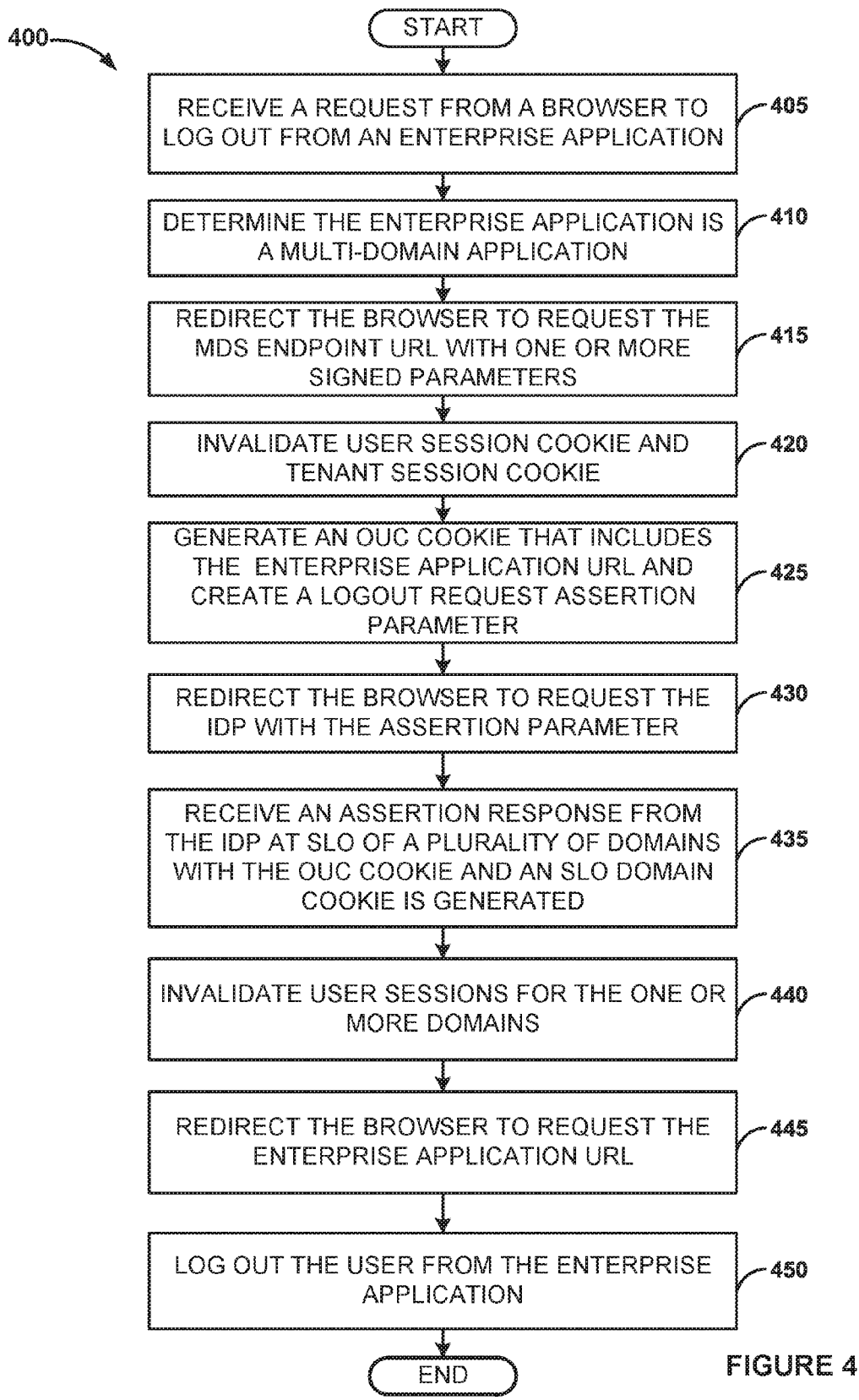
FIG. 4 is a flow diagram illustrating process 400 to perform single logout mechanism for a multi-domain application, according to some embodiments.

FIG. 4 is a flow diagram illustrating process 400 to perform single logout mechanism for a multi-domain application, according to some embodiments. In some embodiments, various hardware elements (e.g., processors) execute program code to perform process 400. Process 400 and other processes described herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 400 defines a procedure to perform single logout (SLO) mechanism for a multi-domain enterprise application in cloud environment. In various embodiments, the SLO is based on the SAML protocol.

At 405, a request is received from a Web browser to log out a user from an enterprise application running in cloud environment. The Web container of the server running the enterprise application checks if the user sending the request is authenticated with the enterprise application. If not, the service provider is invoked to handle the authentication of the user. The request is received at a service provider of a virtual machine. In various embodiments, the service provider is realized as SAML login module 125. At 410, it is determined that the enterprise application is a multi-domain application that can be accessed from multiple domains.

At 415, the browser is redirected to request the MDS endpoint by providing the MDS endpoint URL. For example, "mds.ondemand.com". In addition, the service provider adds one or more request parameters signed by the service provider. The request parameters are may be used by the MDS to create a logout request that will be processed by the IDP. At 420, a user session cookie and a tenant session cookie are invalidated. The request is received at the MDS. The MDS verifies that the request is redirected from the service provider by the signed request parameters included in the request.

At 425, an OUC cookie is generated by the MDS. The OUC cookie includes the enterprise application URL. Based on the verified request parameters signed by the service provider, a logout request is created as a parameter and included in the authentication request. Then, the browser is redirected to request the IDP, at 430. The request includes the IDP URL and the logout request parameter. The IDP authenticates the user and issues an assertion response. Also, the IDP invalidates a session cookie for the user to the IDP. The user is logged out from the IDP. The browser is then redirected to the SLO of the computing system. The SLO URL is listed in the IDP as a predefined configuration.

At 435, the assertion response created by the IDP is received at the SLO service of one or more domains. The assertion response is included in the browser request to the SLO service of one or more domains together with the OUC cookie name. In various embodiments, the SLO iterates through the one or more domains supported by the service provider where the user is logged in. The names of the multiple domains are stored in the application domain cookie. For a domain from the multiple domains, the initial SLO 160 service sends a logout request to the domain specific SLO service of the domain. The domain specific SLO service logs the user out of the domain and sends back a logout response to the initial SLO 160 service. When the domain specific SLO services log the user out of the multiple domains, the browser is redirected to the enterprise application 130 URL.

In various embodiments, the SLO has to redirect the browser back to the enterprise application URL. As the enterprise application URL is not part of the assertion response, the enterprise application URL is retrieved from the OUC cookie. An SLO domain cookie is generated that includes information from the IDP. As a result, at 440, the user sessions for the one or more domains of the service provider are invalidated.

At 445, the browser is redirected to request the enterprise application URL with the assertion response. The OUC cookie, the SLO domain cookie, and the tenant session cookie are invalidated. At 450, the user is logged out of the enterprise application. Finally, the enterprise application determines that the user has logged out and a logout page is returned to the user.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
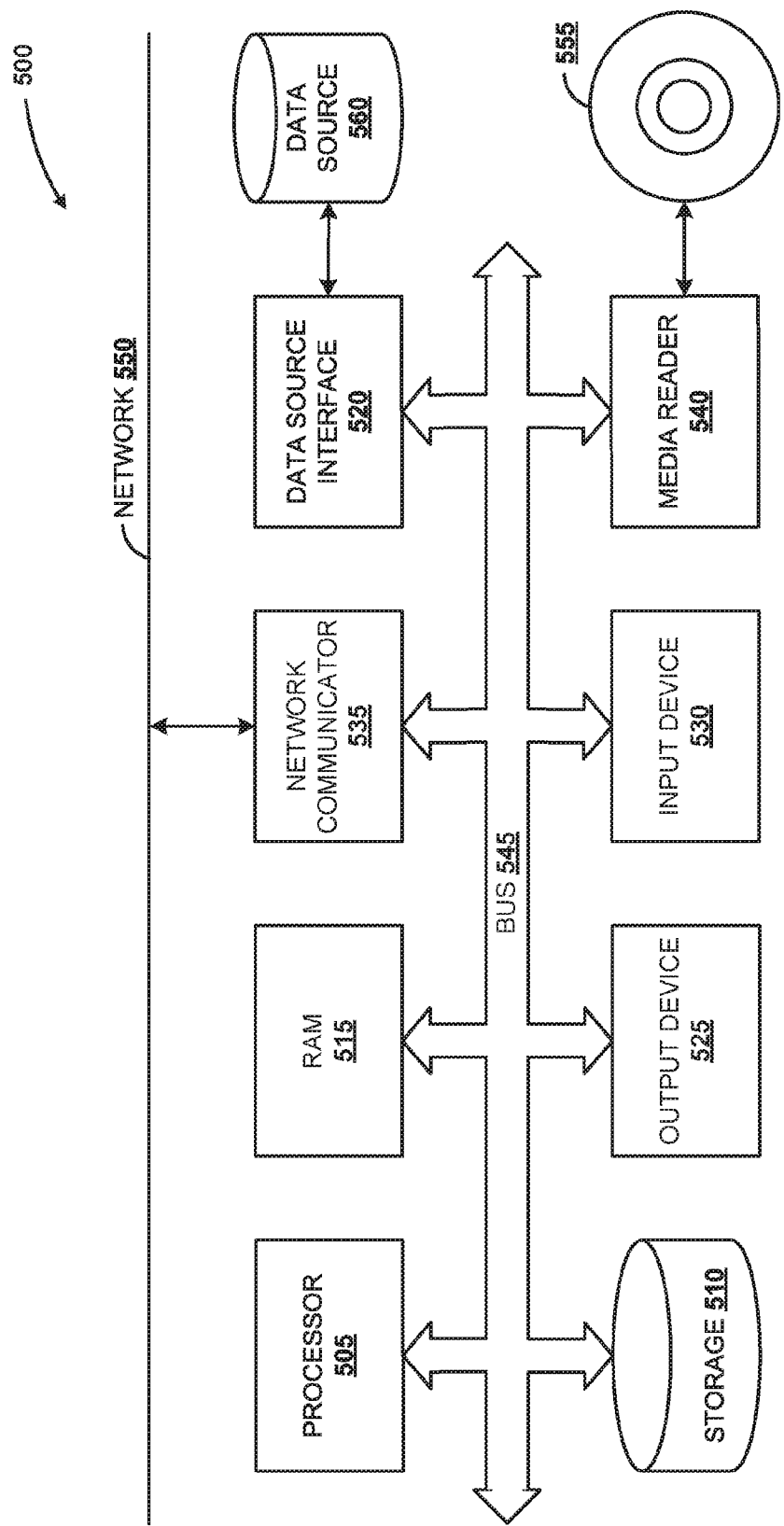
FIG. 5 is a block diagram of an exemplary computer system 500, according to some embodiments.

FIG. 5 is a block diagram of an exemplary computer system 500, according to some embodiments. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiment examples are described herein for illustrative purposes, various equivalent modifications are possible as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method comprising:
    receiving, at a service provider associated with a multi-domain application, a request from a user via a Web browser to access the multi-domain application, wherein the request is a single sign-on (SSO) request or a single logout (SLO) request, and wherein the multi-domain application runs on multiple domains in parallel;
    redirecting the Web browser to a services domain that is different from the multiple domains, wherein the Web browser invokes a multi-domain service (MDS) endpoint accessible from the services domain with an MDS cookie and one or more parameters signed by the service provider,
    wherein the service provider issues the MDS cookie that includes a multi-domain application uniform resource locator (URL) to access a domain of the multi-domain application, and
    wherein the service provider supports authentication and authorization services accessible from the services domain for the multiple domains of the multi-domain application;
    at the services domain:
        generating an original URL cookie (OUC) comprising the multi-domain application URL and a login assertion parameter or a logout assertion parameter, wherein the multi-domain application URL is extracted from the MDS cookie at the MDS endpoint, and wherein the login assertion parameter or the logout assertion parameter is created at the MDS endpoint based on the one or more parameters signed by the service provider;
        redirecting the Web browser to an identity provider, wherein the login assertion parameter and the OUC comprising the multi-domain application URL are included in the SSO request or the logout assertion parameter and the OUC comprising the multi-domain application URL are included in the SLO request;
        receiving an assertion response from the identity provider; and
        redirecting the Web browser to the multi-domain application with the received assertion response, wherein the multi-domain application URL is retrieved from the OUC cookie.

2. The method of claim 1, wherein receiving the assertion response from the identity provider comprises:
    receiving the assertion response at an assertion consumer service (ACS) that the user is authenticated with the identity provider, when redirecting the Web browser to the multi-domain application with the SSO request; or
    receiving the assertion response at a SLO service that the user is logged out from the identity provider, when redirecting the Web browser to the multi-domain application with the SLO request.

3. The method of claim 2, wherein receiving the assertion response at the SLO service comprises:
    receiving the assertion response at the SLO;
    sending a logout request from the SLO service to one or more domain specific SLO services of one or more domains from the multiple domains where the user is logged in; and
    receiving a logout response from the one or more domain specific SLO services that the user is logged out of the one or more domains by invalidating one or more user sessions for the one or more domains.

4. The method of claim 2, wherein an ACS endpoint URL and an SLO service endpoint URL are predefined configurations listed in the identity provider.

5. The method of claim 4, wherein the MDS endpoint, the ACS endpoint, and the SLO service endpoint reside on the services domain.

6. The method of claim 1, wherein redirecting the Web browser to request the multi-domain application with the received assertion response comprises issuing an application domain cookie that includes the multi-domain application URL.

7. The method of claim 1, wherein redirecting the Web browser to request the multi-domain application with the SSO request comprises sending the MDS cookie to the Web browser.

8. A computer system comprising:
    a processor;
    a memory in communication with the processor, the memory storing instructions related to:
        a service provider that receives a request from a user via a Web browser to access a multi-domain application, wherein the service provider is associated with the multi-domain application, wherein the request is a single sign-on (SSO) request or a single logout (SLO) request, wherein the multi-domain application runs on multiple domains in parallel, wherein the service provider redirects the Web browser to a services domain that is different from the multiple domains, wherein the service provider issues an multi-domain service (MDS) cookie that includes a multi-domain application uniform resource locator (URL), and wherein the service provider supports authentication and authorization services accessible from the services domain for the multiple domains of the multi-domain application;
        a multi-domain service (MDS) accessible at the services domain that verifies the request by one or more request parameters signed by the service provider, extracts from the MDS cookie the multi-domain application URL to access a domain of the multi-domain application, generates an original URL cookie (OUC) comprising the multi-domain application URL, and creates a login assertion parameter for the SSO request or a logout assertion parameter for the SLO request;
        an assertion consumer service (ACS) that receives an assertion response that the user is authenticated with an identity provider, retrieves the multi-domain application URL from the OUC cookie, and redirects the Web browser to access the multi-domain application based on the retrieved multi-domain application URL; and a single logout (SLO) service that receives an assertion response that the user is logged out from the identity provider, sends a logout request to one or more domain specific SLO services of one or more domains from the multiple domains where the user is logged in, and receives a logout response from the one or more domain specific SLO services that the user is logged out of the one or more domains by invalidating one or more user sessions for the one or more domains.

9. The computer system of claim 8, wherein the MDS cookie is sent to the Web browser to access the multi-domain application in response to user authentication with the identity provider.

10. The computer system of claim 8, wherein a name of the OUC cookie and the login assertion parameter for the SSO request or the logout assertion parameter for the SLO request are sent to the identity provider.

11. The computer system of claim 8, wherein a URL of an ACS endpoint and a URL of a SLO service endpoint are predefined configurations listed in the identity provider.

12. The computer system of claim 11, wherein an MDS endpoint, the ACS endpoint, and the SLO service endpoint reside on the services domain.

13. The computer system of claim 8, wherein the ACS includes an application domain cookie comprising a name of the domain of the multi-domain application when redirecting the web browser to access the multi-domain application.

14. A non-transitory computer-readable medium storing instructions, which when executed cause a computer system to:

receive, at a service provider associated with a multi-domain application, a request from a user via a Web browser to access the multi-domain application, wherein the request is a single sign-on (SSO) request or a single logout (SLO) request, and wherein the multi-domain application runs on multiple domains in parallel;

redirect the Web browser to a services domain that is different from the multiple domains, wherein the Web browser invokes a multi-domain service (MDS) endpoint accessible from the services domain with an MDS cookie and one or more parameters signed by the service provider, wherein the service provider issues the MDS cookie that includes a multi-domain application URL to access a domain of the multi-domain application, and wherein the service provider supports authentication and authorization services accessible from the services domain for the multiple domains of the multi-domain application;

at the services domain:
generate an original URL cookie (OUC) comprising the multi-domain application URL and a login assertion parameter or a logout assertion parameter, wherein the multi-domain application URL is extracted from the MDS cookie at the MDS endpoint, and wherein the login assertion parameter or the logout assertion parameter is created at the MDS endpoint based on the one or more parameters signed by the service provider;

redirect the Web browser to an identity provider, wherein the login assertion parameter and the original URL cookie (OUC) comprising the multi-domain application URL are included in the SSO request or the logout assertion parameter and the original URL cookie (OUC) comprising the multi-domain application URL are included in the SLO request;

receive an assertion response from the identity provider; and redirect the Web browser to the multi-domain application with the received assertion response, wherein the multi-domain application URL is retrieved from the OUC cookie.

15. The computer-readable medium of claim 14, further comprising instructions that cause the computer system to:

receive the assertion response at an assertion consumer service (ACS) that the user is authenticated with the identity provider, when redirecting the Web browser to the multi-domain application with the SSO request; or receive the assertion response at a single logout (SLO) service that the user is logged out from the identity provider, when redirecting the Web browser to the multi-domain application with the SLO request.

16. The computer-readable medium of claim 15, wherein an ACS endpoint URL and a SLO service endpoint URL are predefined configurations listed in the identity provider.

17. The computer-readable medium of claim 16, wherein the MDS endpoint, the ACS endpoint, and the SLO service endpoint reside on the services domain.

18. The computer-readable medium of claim 15, wherein receiving the assertion response at the SLO service comprises instructions that cause the computer system to:

receive the assertion response at the SLO;

send a logout request from the SLO service to one or more domain specific SLO services of one or more domains from the multiple domains where the user is logged in; and receive a logout response from the one or more domain specific SLO services that the user is logged out of the one or more domains by invalidating one or more user sessions for the one or more domains.

19. The computer-readable medium of claim 14, wherein redirect the Web browser to request the multi-domain application with the received assertion response comprises issue an application domain cookie that includes a name of the domain of the multi-domain application.

20. The computer-readable medium of claim 14, wherein redirecting the Web browser to request the multi-domain application with the SSO request comprises sending the MDS cookie to the Web browser.

* * * * *